US006227727B1

(12) United States Patent
Mielke

(10) Patent No.: US 6,227,727 B1
(45) Date of Patent: May 8, 2001

(54) ELECTROMOTIVE MIRROR DRIVE IN A MIRROR REFLEX CAMERA

(75) Inventor: Bodo Mielke, Wolfenbuettel (DE)

(73) Assignee: Rollei Fototechnic GmbH, Braunschweig (DE)

( * ) Notice: Subject to any disclaimer, the term of this patent is extended or adjusted under 35 U.S.C. 154(b) by 0 days.

(21) Appl. No.: 09/354,721

(22) Filed: Jul. 16, 1999

(30) Foreign Application Priority Data

Jul. 17, 1998 (DE) ................................. 198 32 243

(51) Int. Cl.$^7$ ................................................ G03B 19/12
(52) U.S. Cl. ............................. 396/358; 396/447
(58) Field of Search ........................... 396/354, 358, 396/447, 457, 463, 469

(56) References Cited

U.S. PATENT DOCUMENTS

| 3,852,791 | * | 12/1974 | Eukuda | 396/358 |
|---|---|---|---|---|
| 3,860,941 | | 1/1975 | Fukuda | 396/358 |
| 4,213,689 | * | 7/1980 | Clapp | 396/469 |
| 4,338,009 | | 7/1982 | Lee | 396/358 |
| 4,558,938 | * | 12/1985 | Petersen | 396/464 |
| 4,839,679 | * | 6/1989 | Cameron et al. | 396/469 |
| 5,325,142 | * | 6/1994 | Depatie et al. | 396/449 |
| 5,758,217 | | 5/1998 | Mielke | 396/358 |
| 5,892,990 | * | 4/1999 | Ogi | 396/358 |

FOREIGN PATENT DOCUMENTS 44 47 092   7/1996 (DE) .

* cited by examiner

*Primary Examiner*—David M. Gray
(74) *Attorney, Agent, or Firm*—Foley & Lardner

(57) ABSTRACT

An electromotive drive for swiveling the viewfinder mirror in a single-lens mirror reflex camera between its viewfinder position and its picture taking position. A balanced mirror drive includes a drive arm. The drive arm forms an integral component of the electromotive drive. The drive arm can be electromotively swiveled in about a fixed pivot axis lying parallel to the viewfinder-mirror swivel axis. The drive arm is kinematically coupled with the viewfinder mirror in such a way that the swiveling of the drive arm induces a swiveling in the opposite direction of the viewfinder mirror.

20 Claims, 3 Drawing Sheets

ELECTROMOTIVE MIRROR DRIVE IN A MIRROR REFLEX CAMERA

BACKGROUND OF THE INVENTION

1. Field of the Invention

The invention relates to an electromotive drive for swiveling the viewfinder mirror in a single-lens mirror reflex camera between its viewfinder position and its taking position.

2. Description of Related Art

One such drive is disclosed in DE 44 47 092 A1, in which the electric drive is designed as a plunger coil drive, the magnet head of which is fixed within the camera housing. An angular link is molded onto the coil former of the plunger coil drive. One limb of the link is fork-shaped at its free end forming a slot guide that reaches over a pin, which is fastened on the swivel axis of the viewfinder mirror axially parallel to the axis and with a lever distance from the axis.

One disadvantage of this arrangement is the functionally dependent one-sided mounting of the viewfinder mirror. The mass (dead weight) of the viewfinder mirror exerts a permanent torque about the mirror swiveling axis, which may lead to varying mirror running times as well as vibrations if the position of the camera is changed.

The difficulties or problems with this current alternative drive mechanism are not intended to be exhaustive, but are among many tending to reduce the desirability of such known drive mechanisms. Other notable problems may exist; those presented above, however, should be sufficient to demonstrate that devices appearing in the past are amenable to worthwhile improvement.

SUMMARY OF THE INVENTION

Accordingly, it is a general object of the invention to provide a mirror drive that obviates or minimizes the problems of known drive mechanisms.

A specific object of the invention is to provide a mirror drive that permits position-independent swiveling.

A preferred embodiment of the invention intended to accomplish at least some of the foregoing objects includes a swivel axis; a fixed pivot axis; and a drive arm electromotively swiveled about a fixed pivot axis that is parallel to the viewfinder mirror swivel axis and kinematically connected to the viewfinder mirror, wherein, when the drive arm swivels in a first direction, the drive arm induces a swiveling of the viewfinder mirror in an opposite second direction.

Additional objects and advantages of the invention will be set forth in the following description of the preferred embodiments and, in part, will be apparent from the description or through practicing the invention.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

DETAILED DESCRIPTION OF PREFERRED EMBODIMENTS

Figure 1:
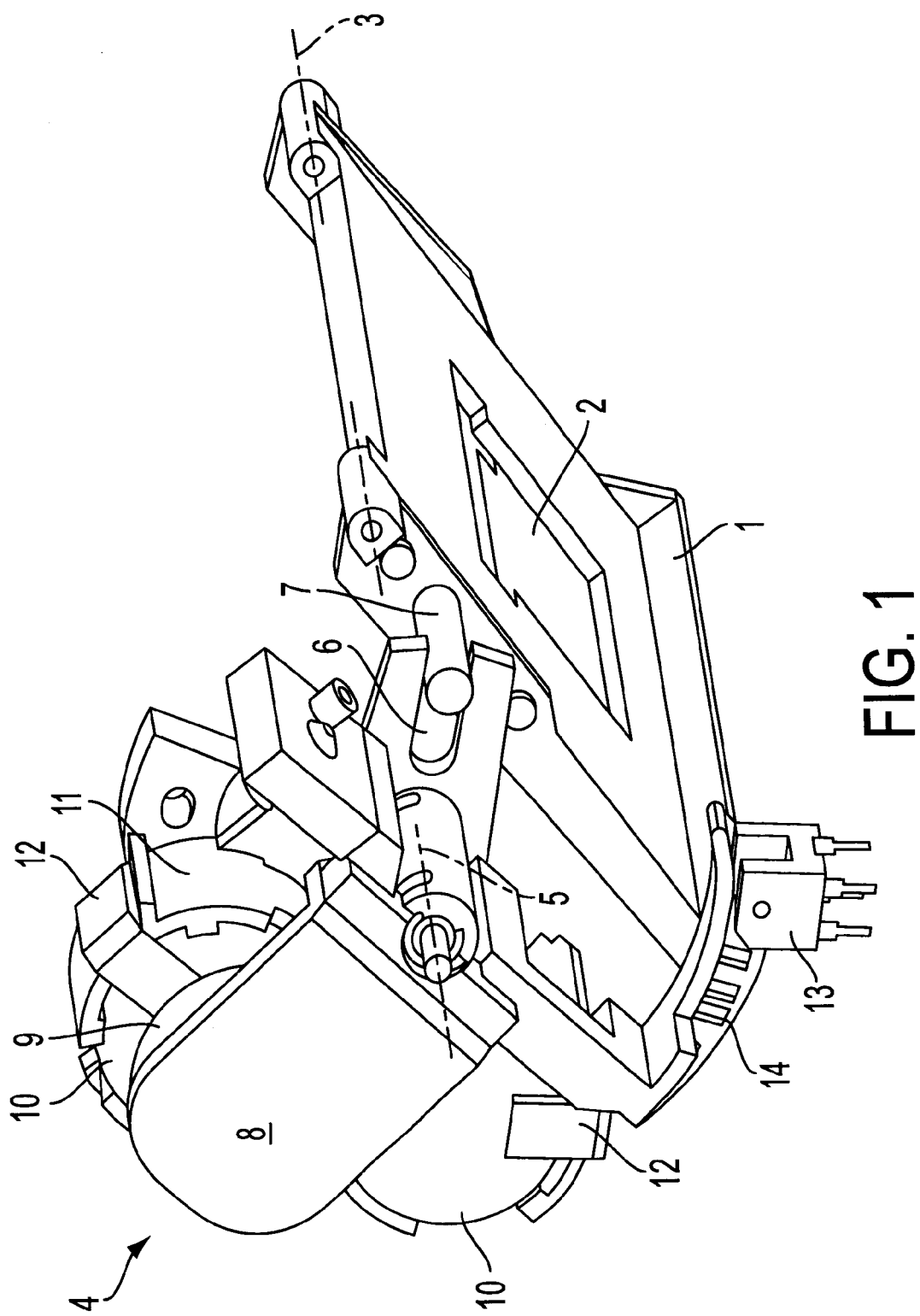
FIG. 1 is a perspective view of an electromotive drive for swiveling a viewfinder mirror.

Referring to FIG. 1, there will be seen an electromotive drive for swiveling a viewfinder-mirror shutter 1 having an integrated viewfinder mirror 2 about a swivel axis 3, which is mounted in a camera housing (not shown). The swiveling of the viewfinder mirror 2 between its viewfinder position and its picture taking position takes place via drive arm 4. Drive arm 4 is an integral component of the electromotive drive that can be swiveled in a reversing manner about a fixed pivot axis 5, which lies parallel to the viewfinder mirror swivel axis 3. This drive arm 4 is kinematically coupled with the viewfinder mirror shutter 1 via a pin/slot guide, in which a slot guide 6 is rigidly connected to the drive arm 4 and reaches over a pin 7. The pin 7 is fastened on the swivel axis 3 of the viewfinder mirror shutter 1, is axially parallel to the swivel axis 3, and has a lever distance h from the swivel axis 3 (see FIG. 3).

The drive arm 4 preferably is a U-shaped yoke 8 forming a magnetic soft-iron keeper. A magnet disk 9 is formed on the inner side of each of the limbs of the U-shaped yoke 8. Two flat coils 10 are arranged at the same height in a coil former 11 between the two magnet disks 9 and are fixed next to each other. The current flowing in one of the flat coils 10 flows in an opposite direction to that flowing through the other flat coil 10.

Each of the two swiveling end positions of the drive arm 4 has a magnet stop 12. Each magnet stop 12 preferably comprises a soft-iron loop fixedly connected to the coil former 11. Each magnet stop 12 reaches over its respective flat coil 10, and the loop end of each magnet stop 12 is adjusted such that it is near the active range of the magnet disk 9. The magnet stop 12 secures the viewfinder mirror 2 in its viewfinder or picture taking position.

FIG. 1 also shows an electromagnetic damping mechanism for the swiveling of the viewfinder mirror shutter 1. A fixed-in-place light barrier 13 acts together with a row of slots 14, fastened to the drive arm 4, to produce a light barrier signal. During the swiveling of the viewfinder mirror shutter 1, the light barrier signal triggers a counter-pulse through the flat coils 10, which damps the swiveling of the viewfinder mirror shutter 1 before it strikes against a mirror stop 18, represented in FIG. 3.

Figure 2:
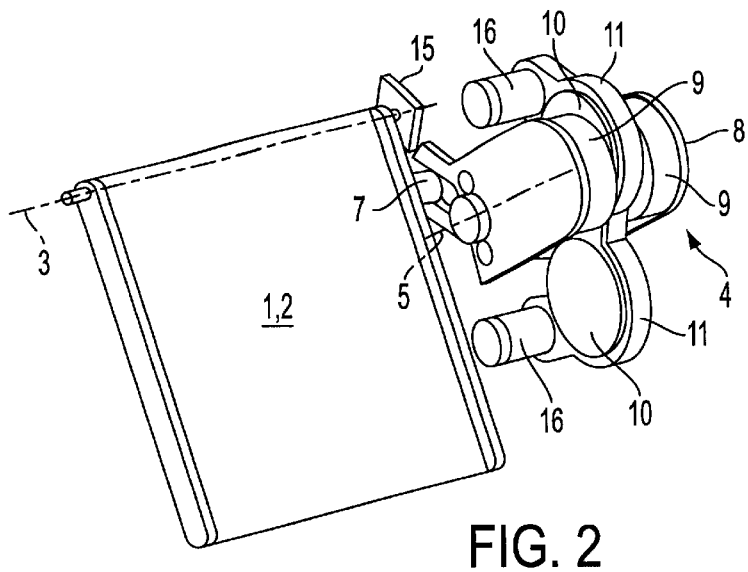
FIG. 2 is a schematic of the embodiment of FIG. 1 in a different viewing direction.

As shown in FIG. 2, the swivel axis 3 of the viewfinder mirror shutter 1 is mounted in a mirror casing 15 and the coil formers 11 are fixed on the mirror casing 15 with fastening pins 16.

It is essential that, irrespective of its position, the viewfinder mirror 1, 2 is in equilibrium with the drive arm 4, which is kinematically connected to the viewfinder mirror 1, 2. In one preferred embodiment, equilibrium results from the fact that the torque caused by the dead weight of the drive arm 4 acting on the mirror pin 7 about pivot axis 5 of the drive arm 4 is approximately equal and opposite to the torque resulting from the dead weight of the viewfinder mirror 1, 2 acting on the pin 7 about mirror swivel axis 3.

Figure 3:
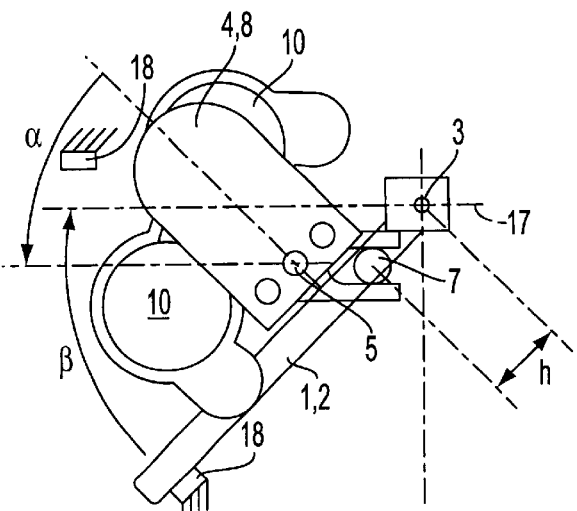
FIG. 3 is a plan view of the embodiment of FIG. 2 with a horizontal camera position.
Figure 4:
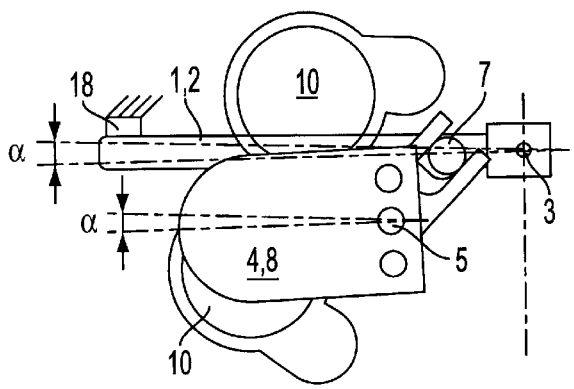
FIG. 4 is a plan view of the embodiment of FIG. 2 in a different swiveling position.

FIG. 3 shows a horizontal camera position 17. The drive arm 4 has a swiveling angle α of, for example, 45° with respect to this horizontal line 17. The swung-down viewfinder mirror shutter 1 has a swiveling angle β with respect to the horizontal line 17 of, for example, 45°. In this case, the mass torque exerted on mirror pin 7 by the drive arm 4 and the viewfinder mirror 1, 2 must be in equilibrium. This applies to every swiveling position, including that represented in FIG. 4, in which the depicted angle γ is respectively about 5°, which corresponds to a mirror pivoting angle of 50°.

In FIG. 3, two stops 18, which define the end positions of the viewfinder mirror shutter 1, are shown.

Figures 5A, 5B:
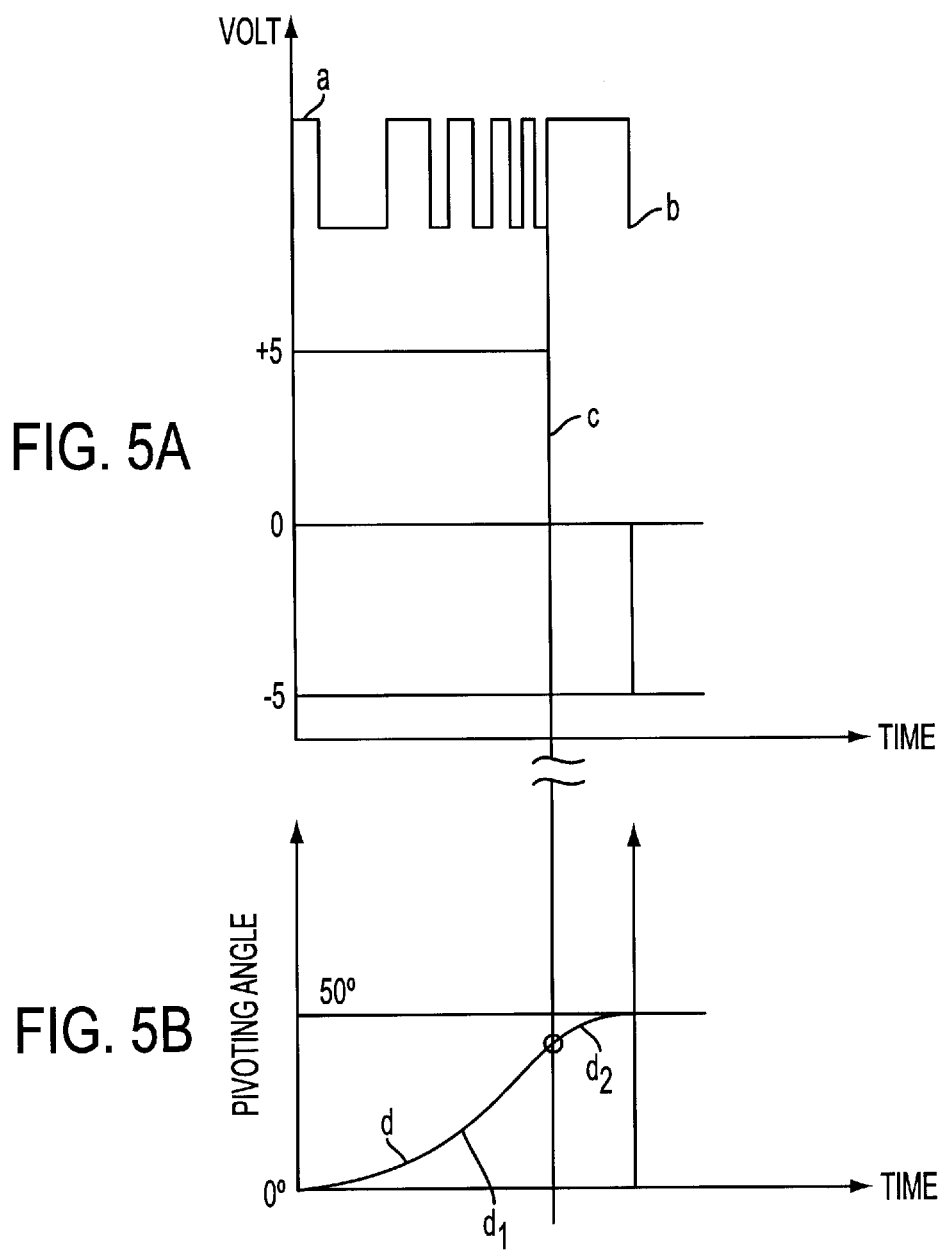
FIG. 5 is a graph of time by voltage and time by pivoting angle of the mirror damping depending on the mirror running time.

FIG. 5 shows diagrams for mirror damping. The upper curve "a" shows the light barrier signal, and the point "b" indicates the end of the path, that is, the abutting of the viewfinder mirror shutter 1 against the upper stop 18. The line "c" shows the counter-pulse exerted for the damping, which commences shortly before the end of path "b." The lower curve "d" shows the pivoting angle of the mirror plotted over time.

The invention encompasses, among other things, a drive arm, which forms an integral component of the electromotive drive, that can be electromotively swiveled in a reversing manner about a fixed pivot axis lying parallel to the viewfinder mirror swivel axis and is kinematically coupled with the viewfinder mirror in such a way that the swiveling of the drive arm induces a swiveling in the opposite direction of the viewfinder mirror. In this case, it is expedient if, irrespective of its position, the viewfinder mirror is in equilibrium with the drive arm kinematically connected to it.

Consequently, part of the mass of the electromotive drive is used to compensate for the mass torque exerted by the mirror. Thus, no additional counterweights or the like are needed to compensate for this torque.

The kinematic connection between the drive arm and the mirror is accomplished by a slot guide rigidly connected to the drive arm and reaching over a pin, which is fastened on the swivel axis of the viewfinder mirror axially parallel to the swivel axis and with a lever distance from the swivel axis.

To obtain a fully balanced mirror drive, the torque exerted by the dead weight of the drive arm on the mirror pin about the pivot axis of the drive arm is approximately equal and opposite to the torque exerted by the dead weight of the viewfinder mirror on the pin about the mirror swivel axis.

In a preferred embodiment, the drive arm is designed as a U-shaped yoke, forming a magnetic soft-iron keeper, the U limbs of which are each fitted on their inner side with a magnet disk, between which there are two flat coils arranged at the same height, fixed next to one another and through which current flows in opposite directions.

A kinematic reversal of this preferred embodiment is also possible. In such a case, the drive arm has two flat coils that can be swiveled together about the pivot axis with respect to a fixed yoke between the magnet disks of the yoke.

Preferably, each of the two swiveling end positions of the drive arm has a magnetic détente or stop. Preferably, the magnetic stop is a fixed soft-iron loop reaching over its assigned flat coil and, together with the magnet disk covering over it, encloses a small air gap.

One disadvantage with known drive systems is that the motive energy of the mirror induces vibrations in the end-position stops. This disadvantage is exacerbated in the case of those embodiments in which electromotive drives are rotationally fixed to the mirror. The damping measures proposed in the prior mechanisms by means of air or rubber damping cannot solve the vibration problem completely. Another proposed damping measure, i.e., utilizing the mass inertia of a counterweight, which is intended to reach into the end-position region by way of gear elements and thus avoid vibrations, is also disadvantageous because a counterweight is required. According to the invention, therefore, an electromagnetic damping in which the damping is preferably regulated by the mirror running time or by the mirror pivoting angle is proposed for the swiveling of the viewfinder mirror. Particularly expedient for this is a regulating device having a fixed light barrier, which acts together with a row of slots fastened on the drive arm, to create the light barrier signal.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

Priority document, DE 198 32 243.7, filed Jul. 17, 1998, is hereby incorporated by reference.

What is claimed is:

1. An electromotive mirror drive in a single-lens mirror reflex camera, comprising:

an electromotive drive that includes a drive arm integrally formed therein, the drive arm being electromotively reversibly tiltable about a pivot axis fixed within a body of the camera;

a viewfinder mirror tiltable about a swivel axis that is parallel to the pivot axis and fixed within the camera body, wherein the viewfinder mirror tilts between a viewfinder position and a picture taking position; and a kinematic connector to kinematically connect the viewfinder mirror to the drive arm;

wherein, when the electromotive drive tilts the drive arm in a first direction, the drive arm tilts the viewfinder mirror in an opposite second direction.

2. An electromotive mirror drive as claimed in claim 1, wherein the viewfinder mirror and the drive arm are always in equilibrium.

3. An electromotive mirror drive as claimed in claim 1, wherein the kinematic connector comprises a pin, fastened to the viewfinder mirror, and a slot guide, formed in the drive arm and engaging over the pin.

4. An electromotive mirror drive as claimed in claim 3, wherein the pin has an axis and is fixed to a lateral edge of the viewfinder mirror beneath the swivel axis, and wherein the axis of the pin is parallel to the swivel axis and is positioned from the swivel axis by a distance (h) to define a lever distance (h).

5. An electromotive mirror drive as claimed in claim 3, wherein a first torque resulting from dead weight of the drive arm on the pin about the pivot axis of the drive arm is equal and opposite to a second torque resulting from a dead weight of the viewfinder mirror on the pin about the swivel axis.

6. An electromotive mirror drive as claimed in claim 1, wherein the drive arm comprises a U-shaped magnetic soft-iron yoke that includes first and second side portions, each side portion having an inner wall, wherein the inner walls oppose each other.

7. An electromotive mirror drive as claimed in claim 6, further comprising first and second magnetic disks, wherein the first magnetic disk is fixed on the inner wall of the first side portion of the U shaped yoke and the second magnetic disk is fixed on the inner wall of the second side portion of the U shaped yoke.

8. An electromotive mirror drive as claimed in claim 7, further comprising two flat coils fixed next to each other in the camera body and each positioned in a common plane between the two magnetic disks, wherein at least one of the flat coils is positioned between said magnetic disks at each tilt position of the drive arm and the viewfinder mirror.

9. An electromotive mirror drive as claimed in claim 8, wherein a current flowing through the first flat coil flows in a direction opposite to a current flowing through the second flat coil.

10. An electromotive mirror drive as claimed in claim 1, further comprising a first magnetic stop defining a first tilt end position of the drive arm and a second magnetic stop defining a second tilt end position of the drive arm.

11. An electromotive mirror drive as claimed in claim 10, further comprising two flat coils fixed next to each other in the camera body, wherein each magnetic stop comprises a fixed soft-iron loop partially extending over a respective one of the flat coils.

12. An electromotive mirror drive as claimed in claim 1, further comprising means for electromagnetically damping the viewfinder mirror when tilted about the swivel axis.

13. An electromotive mirror drive as claimed in claim 12, further comprising control means for controlling the electromagnetic damping as a function of the time for tilting the viewfinder mirror from the viewfinder position to the picture taking position or vice versa.

14. An electromotive mirror drive as claimed in claim 12, further comprising control means for controlling the electromagnetic damping as a function of the angular displacement of the viewfinder mirror from the viewfinder position to the picture taking position or vice versa.

15. An electromotive mirror drive as claimed in claim 14, wherein said control means comprises a fixed-in-place photoelectric barrier disposed in the camera body; and a row of slots fastened on the drive arm; wherein a light barrier signal is produced when a slot of the row of slots passes a light beam generated by the photoelectric barrier.

16. A mirror drive in a single-lens mirror reflex camera, comprising:

a drive arm electromotively and reversibly tiltable about a pivot axis fixed within a body of the camera;

a viewfinder mirror tiltable about a swivel axis fixed within the camera, the swivel axis being oriented parallel to the pivot axis, wherein the viewfinder mirror is tiltable between a viewfinder position and a picture taking position; and a pin/slot guide to kinematically couple the viewfinder mirror to the drive arm, the guide comprising a pin fixed to a lateral edge of the viewfinder mirror and a slot formed in the drive arm and engaging over the pin; wherein a first torque resulting from dead weight of the drive arm on the pin about the pivot axis is substantially equal and opposite to a second torque resulting from a dead weight of the viewfinder mirror on the pin about the swivel axis, and wherein, when the drive arm is tilted in a first direction, the drive arm tilts the viewfinder mirror in an opposite second direction.

17. A mirror drive as claimed in claim 16, further comprising:

a U-shaped yoke that includes first and second side portions, each side portion having an inner wall, wherein the inner walls oppose each other;

first and second magnetic disks, wherein the first magnetic disk is fixed on the inner wall of the first side portion of the U shaped yoke and the second magnetic disk is fixed on the inner wall of the second side portion of the U shaped yoke; and two flat coils disposed in a coil former and positionally fixed relative to each other in the camera body, wherein the flat coils are positioned in a plane between the two magnetic disks, wherein at least one of the flat coils is positioned between the magnetic disks at each tilt position of the drive arm and the viewfinder mirror.

18. A method for reducing vibrations in a single-lens mirror reflex camera when a viewfinder mirror is swiveled from a viewfinder position to a picture taking position, comprising:

providing an electromotively and reversibly tiltable drive arm that is tiltable about a pivot axis fixed within a body of the camera;

providing a tiltable viewfinder mirror that is tiltable about a swivel axis fixed within the camera body and is oriented in parallel to the pivot axis;

kinematically coupling the viewfinder mirror to the drive arm; and imparting movement to the drive arm, wherein, when the drive arm is tilted in a first direction, the drive arm tilts the viewfinder mirror in an opposite second direction, and wherein a first torque resulting from dead weight of the drive arm on a pin about the pivot axis is substantially equal and opposite to a second torque resulting from a dead weight of the viewfinder mirror on the pin about the swivel axis.

19. The method of claim 18, further comprising:

electromagnetically damping the movement of the drive arm and the viewfinder mirror, wherein the damping comprises electromagnetically controlling movement of the drive arm prior to the drive arm reaching a fixed stop point.

20. The method of claim 19, further comprising:

generating a damping signal to trigger a counter-pulse through a flat coil immersed between two magnet disks, the damping signal being based on a light barrier signal that is produced when a slot of a row of slots fastened to the drive arm passes a light beam generated by a fixed in place light barrier.

* * * * *